UNITED STATES PATENT OFFICE.

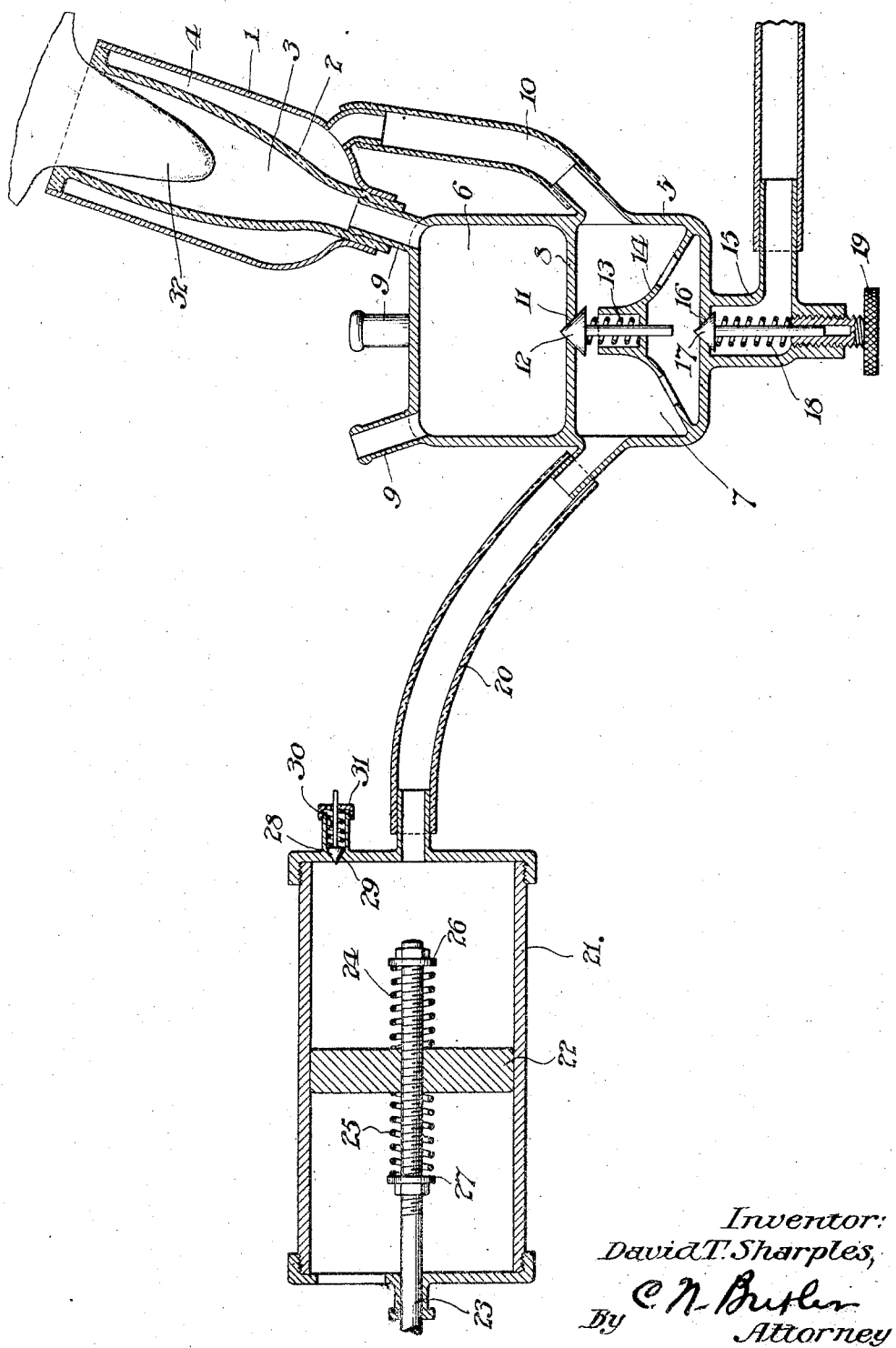

DAVID TOWNSEND SHARPLES, OF WEST CHESTER, PENNSYLVANIA.

MILKING-MACHINE.

1,218,125. Specification of Letters Patent. Patented Mar. 6, 1917.

Application filed May 8, 1916. Serial No. 96,005.

*To whom it may concern:*

Be it known that I, DAVID T. SHARPLES, a citizen of the United States, residing at West Chester, in the county of Chester and State of Pennsylvania, have invented certain Improvements in Milking-Machines, of which the following is a specification.

This invention is a milking machine comprising improved means for applying suction and intermittent pressure to the teat and discharging milk therefrom to the receptacle therefor, the invention being characterized by its means for effecting and regulating the suction and pressure by which the teat is pulsated, its simplicity of construction, its facility for application, its portability and its efficiency.

The characteristic features of the invention are fully disclosed in the following description and the accompanying drawing in illustration thereof.

The drawing is a sectional elevation of apparatus illustrating my improvements.

The mechanism illustrated comprises a teat cup 1 containing a pliable diaphragm 2, which form the chambers 3 and 4.

A shell 5 contains chambers 6 and 7 which are separated by a diaphragm 8, the shell being connected with teat cups 1, as by nipples 9, effecting communication between the chambers 3 and 6, and by ducts 10 effecting communication between the chambers 4 and 7.

The diaphragm 8 contains a port 11 which is controlled by a check valve 12 seated by a spring 13, the valve being guided and the spring supported by the bearing means 14 within the shell 5.

A duct 15 is connected with the shell 5 and communicates with the chamber 7 through the port 16, which is controlled by a check valve 17 seated by a spring 18, the valve being guided and the spring supported by a screw 19.

The shell 5 is connected by a duct 20 with the cylinder 21, by which the chamber 7 communicates with the interior of the cylinder.

A piston 22 is adapted to be reciprocated in the cylinder 21 by a rod 23 which acts on the piston through the springs 24 and 25, the tension of the springs being adjustable by turning their supporting nuts 26 and 27 on the threaded rod 23, and the interior of the cylinder in the rear of the piston being in free communication with the atmosphere.

A check valve 28 is placed between the diaphragm 2 and the piston 22 to control a relief port 29 on which the valve is seated by a spring 30, supported by an adjustable bearing 31, the valve 28 and port 29 being placed conveniently in the forward head of the cylinder 21, but it may be located anywhere so that it will operate to relieve the pressure.

The cylinder 21 being connected in the desired position, the rod 23 attached to the motor mechanism by which it is operated and the cups 1 applied to the teats 32, the rearward stroke of the piston 22 will exhaust air from the teat chamber 3 and the auxiliary chamber 4 so that the cups will be held upon the teats and milk will be drawn therefrom through the ducts 9, chamber 6 and port 11 into the chamber 7, which is of sufficient size to hold the milk thus discharged. In this operation, the diaphragm 2 is expanded since the vacuum created in the chamber 4 is superior to that in the chamber 3 due to the action of the spring pressed valve 12.

The vacuum is regulated by adjusting the tension of the spring 24, which determines the rearward movement of the piston 22 and the consequent exhaustion in the chambers 3 and 4. The chamber 6 being exhausted by the rearward movement of the piston and the vacuum created therein being held by the valve 12, the cups are held on the teats notwithstanding a certain amount of leakage of air into the vacuum space in constant communication with the teats because the vacuum in this comparatively large space is not materially affected by such leakage.

The reciprocating piston, having completed its rearward movement, now moves forward in the cylinder and pressure is communicated through the duct 20, chamber 7 and ducts 10 to the chambers 4, the diaphragms 2 being pressed against the teats and the valve 17 being opened so that milk escapes through the port 16 and duct 15 to the receptacle. The pressure upon the teats is regulated by regulating the tension of the spring 25 by the nut 27, spring 30 by the cap 31, or the spring 18 by the screw 19, one or more of which may be used as found expedient.

The regulation of the effect of the pump, as by the means described, is important, since the vacuum and the pressure or either may be found inferior or superior to that which is desirable to obtain efficient milking and to avoid irritation or soreness to the teats. The means for effecting the regulation permit the use of any desired pressure from that of the atmosphere to any necessary degree.

It will be understood that the particular form of apparatus shown and described is by way of explaining the principles of my invention, and that such form may be modified or supplemented in details of construction within the scope of my invention.

Having described my invention, I claim:

1. In a milking machine, the combination of a teat cup having a suction chamber and a suction and pressure chamber, ducts connected with the respective chambers, means comprising a duct adapted to communicate with said ducts, means for varying the pressure in said duct so as to exhaust said chamber first named and to alternately exhaust and apply pressure in said chamber second named, and means for regulating said pressure.

2. In a milking machine, a chambered teat cup having a flexible diaphragm, a duct, a pump which varies the pneumatic pressure in said duct, means for regulating the variations in said pressure, and means for connecting said duct with the respective chambers of said cup so as to pulsate said diaphragm.

3. In a milking machine, a teat cup having a diaphragm providing two chambers therein, a pump, a duct connected with said pump, means for connecting said duct with the respective chambers so that said pump will simultaneously exhaust said chambers and alternately therewith apply pressure in one of said chambers, and means for limiting said pressure to a desired degree.

4. In a milking machine, a teat cup having a diaphragm providing a teat chamber and an auxiliary chamber, in combination with means connected with the respective chambers for exhausting said teat chamber and pulsating the pressure in said auxiliary chamber, said means comprising a duct through which said chambers are simultaneously exhausted and alternately therewith pressure is applied in said auxiliary chamber, and valve mechanism for regulating said pressure.

5. In a milking machine, a teat cup having a diaphragm providing separated chambers, a device having communicating chambers connected in communicating relation with the chambers of said teat cup, a valve for controlling communication between the chambers of said device, and pneumatic means connected with a chamber of said device for exhausting a chamber of said teat cup and for pulsating the pressure in the other chamber of said teat cup.

6. In a milking machine, a teat cup having a diaphragm providing a teat chamber and an auxiliary chamber, a shell having chambers connected by a passage controlled by a check valve, means for connecting the chambers of said shell with the chambers of said teat cup, a receptacle connected by a valved passage with a chamber of said shell, and means acting through said mechanism for exhausting said teat chamber and pulsating the pressure in said auxiliary chamber.

7. In a milking machine, a teat cup having a diaphragm providing a teat chamber and an auxiliary chamber, a vacuum chamber connected in communicting relation with said teat chamber, a vacuum and pressure chamber connected in communicating relation with said auxiliary chamber, a check valve for controlling communication between said vacuum chamber and said vacuum and pressure chamber so that said valve is opened by suction in said chamber last named, means for applying suction and pressure alternately to said chamber last named, a passage for discharging the contents of said chamber last named, and a valve for controlling said passage and opened by pressure in said chamber last named.

8. In a milking machine, a teat cup having a teat chamber and an auxiliary chamber in combination with means comprising a suction and pressure duct for simultaneously exhausting said chambers so that the vacuum in said auxiliary chamber shall be superior to that in said teat chamber and alternately therewith applying pressure in said auxiliary chamber.

9. In a milking machine, a teat cup having a diaphragm providing a teat chamber and an auxiliary chamber, means comprising a suction and pressure duct for simultaneously exhausting said chambers and alternately therewith applying pressure in said auxiliary chamber, and relief mechanism for regulating the pressure in said auxiliary chamber.

In testimony whereof I have hereunto set my name this 5th day of May, 1916.

DAVID TOWNSEND SHARPLES.